No. 625,622. Patented May 23, 1899.
T. B. WHITTLESEY & F. Y. McKINSTRY.
MACHINE FOR SKINNING FAT MEAT.
(Application filed Jan. 30, 1899.)
(No Model.) 2 Sheets—Sheet 2.
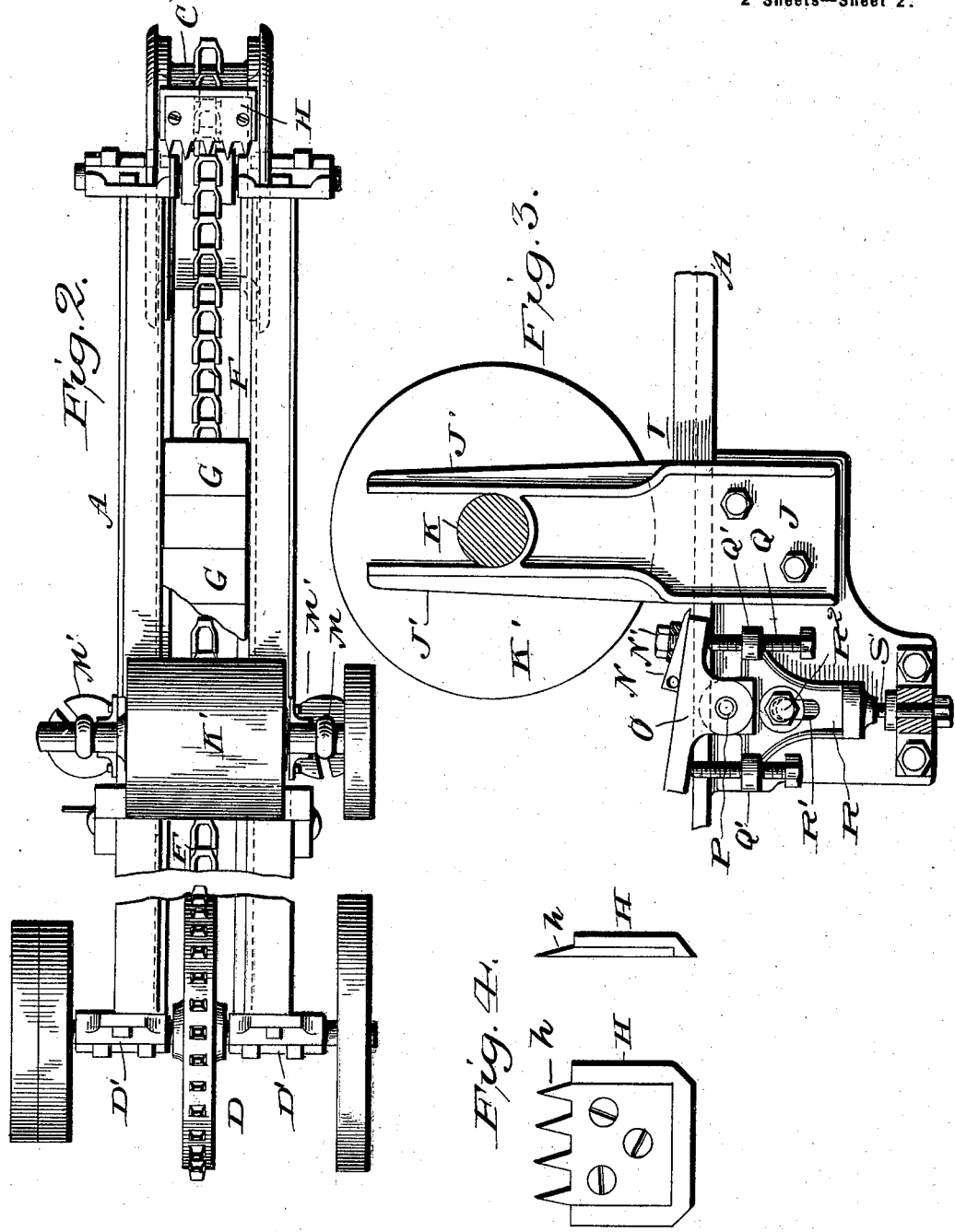

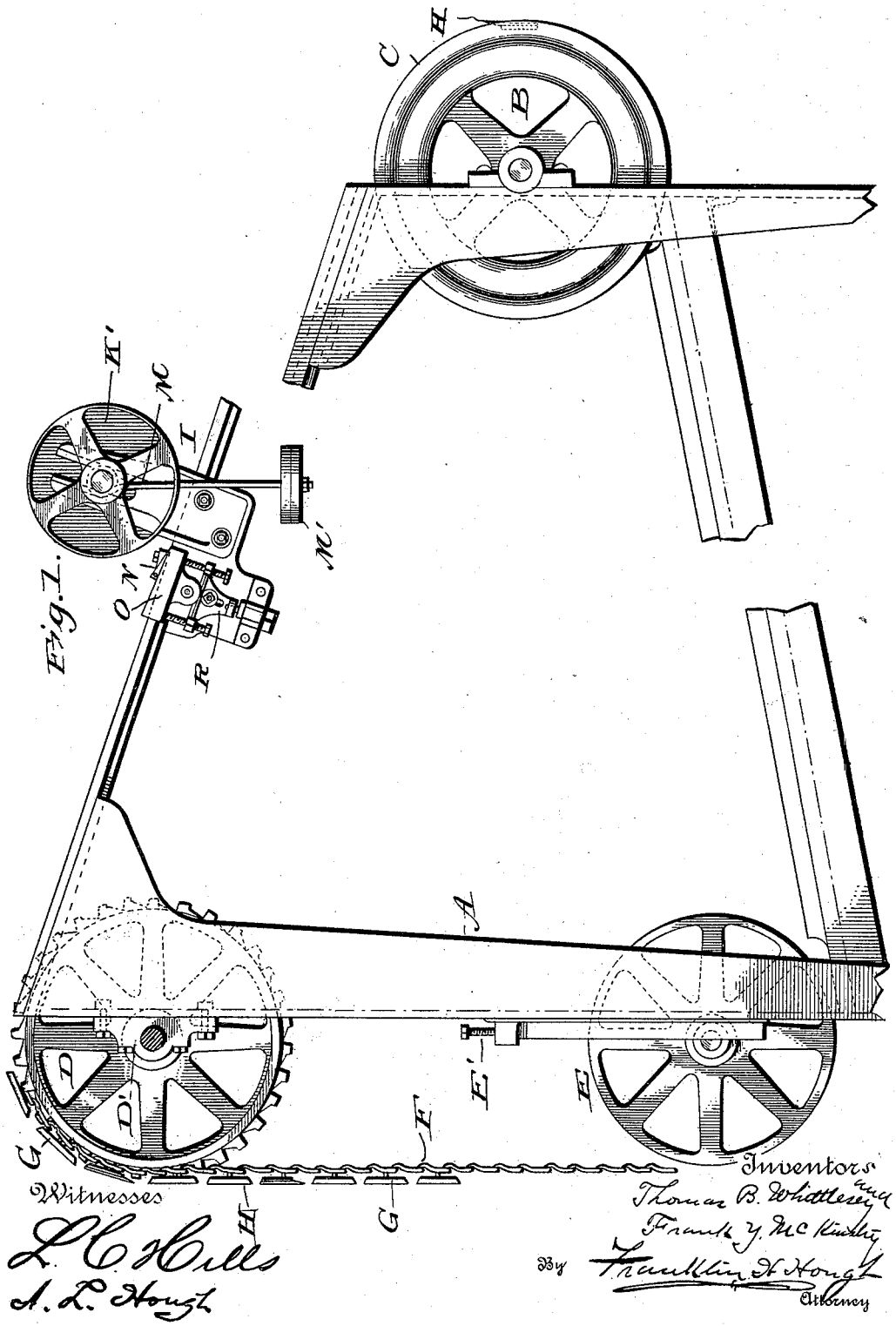

UNITED STATES PATENT OFFICE.

THOMAS B. WHITTLESEY AND FRANK Y. McKINSTRY, OF SOUTH OMAHA, NEBRASKA.

MACHINE FOR SKINNING FAT MEAT.

SPECIFICATION forming part of Letters Patent No. 625,622, dated May 23, 1899.

Application filed January 30, 1899. Serial No. 703,852. (No model.)

*To all whom it may concern:*

Be it known that we, THOMAS B. WHITTLESEY and FRANK Y. MCKINSTRY, citizens of the United States, residing at South Omaha, in the county of Douglas and State of Nebraska, have invented certain new and useful Improvements in Machines for Skinning Fat Meat; and we do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in machines for skinning fat meat; and it consists in the provision of a machine having a carriage which is designed to convey the fat to and underneath a roller, thence in contact with a knife which may be adjusted at any desired angle, whereby as the meat is fed over the said knife the fat is severed from the skin of the meat, the fat adjacent to the skin being made more easy to separate by reason of the knife being heated, causing the fat to slightly melt as the knife separates the same from the meat.

More specifically, the present invention resides in the provision of an endless carrier having hooks designed to engage with the skin of the meat and feed the same forward underneath weighted rollers, where it is slightly compressed and fed forward and held rigidly while a knife removes the fat, after which the skin is advanced and allowed to become disengaged from the carrier as it passes over a downwardly-disposed portion of the machine.

To these ends and to such others as the invention may pertain the same consists, further, in the novel construction, combination, and adaptation of parts, as will be hereinafter more fully described and then specifically defined in the appended claims.

Our invention is clearly illustrated in the accompanying drawings, which, with the letters of reference marked thereon, form a part of this application, and in which drawings similar letters of reference indicate like parts throughout the several views, in which—

Figure 1 is a side elevation of our machine. Fig. 2 is a top plan view. Fig. 3 is an enlarged detail view of the knife and adjusting means, and Fig. 4 is a detail view of one of the hooked plates which is attached to the endless chain for conveying the fat forward to the cutting-knife.

Reference now being had to the details of the drawings by letter, A designates the framework of the machine, at the forward end of which is mounted a shaft B in suitable bearings, and on said shaft is keyed a pulley C, and at the rear of the machine, at its upper end, is mounted a sprocket-wheel D in suitable boxing D', and underneath said sprocket-wheel and near the lower end of the frame is a pulley E, which is adapted to be vertically adjustable by means of set-screw E', whereby the sprocket-chain F, which passes over said sprocket-wheel and pulleys C and E, may be made taut or loosened, as may be desired. The upper surface of the machine is preferably inclined at an angle, as shown clearly in Fig. 1 of the drawings, and up this incline the sprocket-chain is adapted to form an endless carrier to convey the skin to be separated from the fat contained thereon. To said chain are attached plates G, which form a flat surface on which the meat rests, and these plates are riveted, preferably, to alternate links on the endless chain, and at suitable intervals on said chain are disposed the plates H, which have teeth $h$, which are outwardly extended and designed to engage with the skin of the meat and cause the latter to be fed forward up the incline plane to be engaged by the knife which separates the fat from the skin.

Mounted at any suitable location, as at I, on the frame is a standard J, which has two upwardly-forked arms J', there being two of these plates similarly constructed on opposite sides of the machine. Mounted loosely between these arms, which form forked plates, is a shaft K, which shaft has keyed thereto the hollow cylindrical roller K', and loosely mounted over said shaft is a rod M, which carries weights M', designed to cause the said cylindrical roller to bear with considerable pressure on the meat which passes underneath the same between its circumference and the flat surface formed by the plates G, secured to the sprocket-chain. On this rod may be placed weights of different sizes, as may be desired. Immediately in the rear of said standard I is the cutting-knife N, which is bolted to the rocking plate O by means of bolts N'. Said rocking plate O is pivoted to stub-shafts P, mounted on the vertically-adjustable blocks R, which have elongated apertures R', through which apertures extends a bolt or rod R$^2$, and the angle at which it is desired said plate to be held may be adjusted by means of the screws Q, there being two engaging under the opposite edges of said plate, as shown clearly in the drawings. These screws are held in threaded lugs Q' on the said block R. In order to adjust the block R, I provide a set-screw S, which engages with a threaded aperture in the lower end of said block, and by raising or lowering this screw the block carrying the knife may be adjusted at the height desired.

In order to make the fat separate more readily from the skin portion of the meat, it is our purpose to heat the knife in any suitable way, as by means of hot water or steam, and for this purpose the knife may be made hollow, if desired, and any suitable connection made thereto for communicating the hot water or steam, whereby the fat may be slightly melted as it is separated as the skin is driven forward under the cutting edge of the knife.

The operation of our machine will be readily understood when taken in connection with the drawings forming a part of this application, and is as follows: The pieces of skin are placed on the endless carrier and engaged by the toothed plates disposed at different locations on the chain, and are fed forward up the incline and underneath the weighted cylinder, which presses the skin against the endless chain and holds the same securely while the fat is separated from the skin portion of the fat by means of the cutting-knife, which has been previously set at the desired angle, so as to separate the fat without the edge of the knife cutting into the skin.

Having thus described our invention, what we claim to be new, and desire to secure by Letters Patent, is—

1. A machine for skinning fat meat, comprising an endless carrier, an adjustable bracket secured to the carrier-frame, a tilting knife-carrying plate mounted on said bracket, and knife bolted to said plate, combined as set forth.

2. A machine for skinning fat meat, comprising an endless carrier, a casting secured to the carrier-frame, a weighted roller mounted on said casting, a vertically-adjustable bracket held to the casting, a pivoted knife-carrying plate on said bracket, and set-screws for holding the plate at different angles, combined as set forth.

3. In a machine for skinning fat meat, the combination with the endless carrier-frame, the casting secured thereto, the vertically-adjustable bracket mounted thereon, the pivoted knife-carrying plate carried by said bracket, the integral apertured lugs Q' on the latter, and set-screws threaded in said apertures, and adapted to hold the knife-carrying plate at various angles, as set forth.

In testimony whereof we affix our signatures in presence of two witnesses.

THOMAS B. WHITTLESEY.
FRANK Y. McKINSTRY.

Witnesses:
B. SAWYER,
LEONARD BURGET.